US007417189B2

(12) United States Patent
Sawada

(10) Patent No.: US 7,417,189 B2
(45) Date of Patent: Aug. 26, 2008

(54) CONNECTION STRUCTURE FOR LEAD WIRE AND HEATER WIRE

(75) Inventor: Kazunori Sawada, Osaka (JP)

(73) Assignee: Nitta Moore Company, Osaka (JP)

( * ) Notice: Subject to any disclaimer, the term of this patent is extended or adjusted under 35 U.S.C. 154(b) by 0 days.

(21) Appl. No.: 11/854,658

(22) Filed: Sep. 13, 2007

(65) Prior Publication Data

US 2008/0060845 A1 Mar. 13, 2008

(30) Foreign Application Priority Data

Sep. 13, 2006 (JP) ............................. 2006-247809

(51) Int. Cl.
*H02G 15/08* (2006.01)

(52) U.S. Cl. ..................................... 174/88 R; 174/650

(58) Field of Classification Search ............... 174/88 R, 174/77 R, 151, 650
See application file for complete search history.

(56) References Cited

U.S. PATENT DOCUMENTS 2,470,066 A * 5/1949 Calabrese ............... 174/152 R
4,454,381 A * 6/1984 Ito et al. ..................... 174/151
2008/0017415 A1 * 1/2008 Suter et al. .................. 174/650

* cited by examiner

*Primary Examiner*—Chau N Nguyen
(74) *Attorney, Agent, or Firm*—Hahn & Voight; Roger C. Hahn

(57) ABSTRACT

A connection structure for a lead wire and a heater wire includes a tube member, a body housed in the tube member in a watertight manner, a through hole extending in an axial direction of the tube member in the body, seal members respectively arranged at both sides of the through hole, and stopper members each having a hole formed coaxially with the through hole and allowing the seal members to be removably attached with respect to the body wherein the heater wire is extended into the body from a liquid side in such a manner as to pass through both the hole and the seal member at one side, the lead wire is extended out of the body toward an electric power supply to be connected with in such a manner as to pass through both the hole and the seal member at the other side, and a connecting section of the heater wire and the lead wire is located in a space of the through hole between the seal members. This connection structure needs only a small space, has excellent workability, and causes no twisting of the lead wire and the heater wire.

4 Claims, 6 Drawing Sheets

CONNECTION STRUCTURE FOR LEAD WIRE AND HEATER WIRE

INCORPORATION BY REFERENCE

The present invention claims priority under 35 U.S.C. §119 to Japanese Patent Application No. 2006-247809 filed on Sep. 13, 2006. The content of the application is incorporated herein by reference in its entirety.

BACKGROUND OF THE INVENTION

1. Field of the Invention

The present invention relates to a structure for connecting a lead wire (a power supply wire) and a heater wire to each other and, more particularly, to a connection structure for a lead wire and a heater wire for use in a pipe joint or the like.

2. Description of the Related Art

Such a connection structure for a lead wire and a heater wire is disclosed in, for example, Japanese Published Unexamined Patent Application No. 2005-351333.

In this connection structure, as shown in FIG. 6, a lead wire LW and a heater wire HW are connected to each other (at a connecting section t) by inserting the lead wire LW into a cap member 90 and inserting the heater wire HW into another cap member 91, then a female screw 92 and a male screw 93 in the cap members 90 and 91 are screwed with each other, and subsequently, the male screw 93 is screwed into a pipeline 96, whereby O-rings 94, 95 and 97 prevent any liquid from leaking into the connecting section t.

However, this connection structure for the lead wire LW and the heater wire HW poses the following problems:

(1) since the diameter of the cap members 90 and 91 tends to be relatively large, a considerably large space is required for connecting a plurality of lead wires LW to a plurality of heater wires HW;

(2) after connecting the lead wire LW and the heater wire HW to each other, the cap member 90 and the cap member 91 always have to be screwed together and this is a cumbersome work; and (3) there may occur an unfavorable situation in which the lead wire LW and the heater wire HW are twisted due to a contact resistance with the O-rings 94 and 95 in screwing the cap members 90 and 91 with each other: namely, breakage may be caused by torsion if the wires are weak.

In view of this, engineers in this field desperately wish development of a connection structure for a lead wire and a heater wire which needs only a small space, has excellent workability, and causes no twisting of the lead wire LW and the heater wire HW.

DISCLOSURE OF THE INVENTION

It is an object of the present invention to provide a connection structure for a lead wire and a heater wire which needs only a small space, has excellent workability, and causes no twisting of the lead wire and the heater wire.

A connection structure for a lead wire and a heater wire of this invention includes a tube member 60, a body 1 housed in the tube member 60 in a watertight manner, a through hole 10 extending in an axial direction of the tube member 60 in the body, seal members 2 respectively arranged at both sides of the through hole 10, and stopper members 3 each having a hole 30 formed coaxially with the through hole 10 and allowing the seal members 2 to be removably attached with respect to the body 1. The heater wire HW is extended into the body 1 from a liquid side, for example the tank 6, in such a manner as to pass through both the hole 30 and the seal member 2 at one side, while the lead wire LW is extended out of the body 1 toward an electric power supply to be connected with in such a manner as to pass through both the hole 30 and the seal member 2 at the other side. A connecting section t of the heater wire HW and the lead wire LW is located in a space of the through hole 10 between the seal members 2.

Further, the body 1 may be provided with a plurality of through holes 10 with a corresponding number of the seal members 2 and the holes 30 of the stopper members 3.

Moreover, The body 1 may be provided with the second through hole 10*a*, the second seal members 2 and the second holes 30*a* of the stopper member 3 respectively at both side of the second through hole 10*a*, so that an inner tube T1 passes through the second through hole 10*a* and the second holes 30*a* in a watertight manner by the second seal members 2*a*.

DETAILED DESCRIPTION OF THE PREFERRED EMBODIMENTS

Detailed description will be given below of a connection structure for a lead wire and a heater wire in preferred embodiments according to the present invention.

First Embodiment

Figure 1:
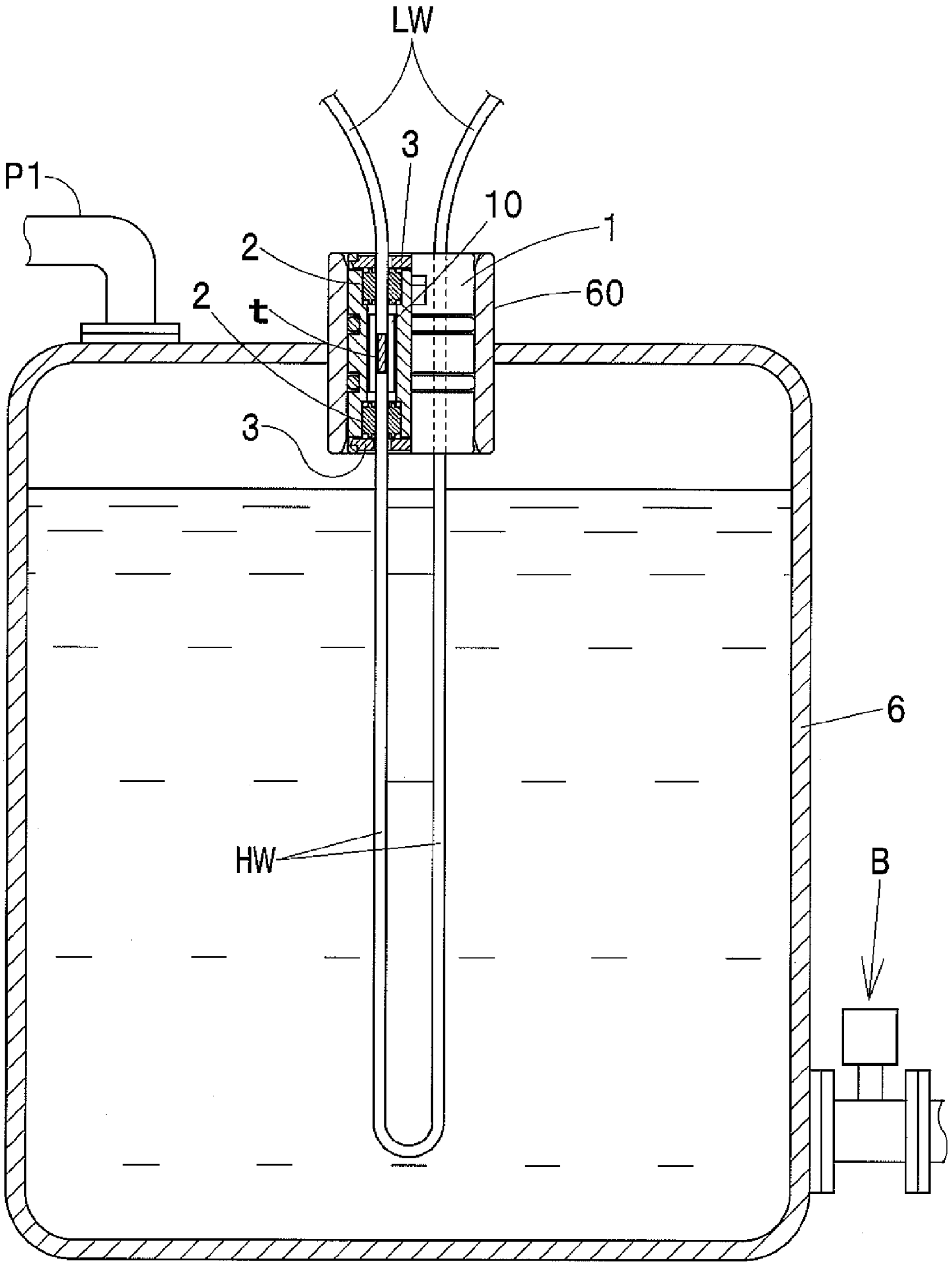
FIG. 1 is a cross-sectional view showing a connection structure for a lead wire and a heater wire, which is applied to a tank, in a first embodiment according to the present invention.
Figure 2:
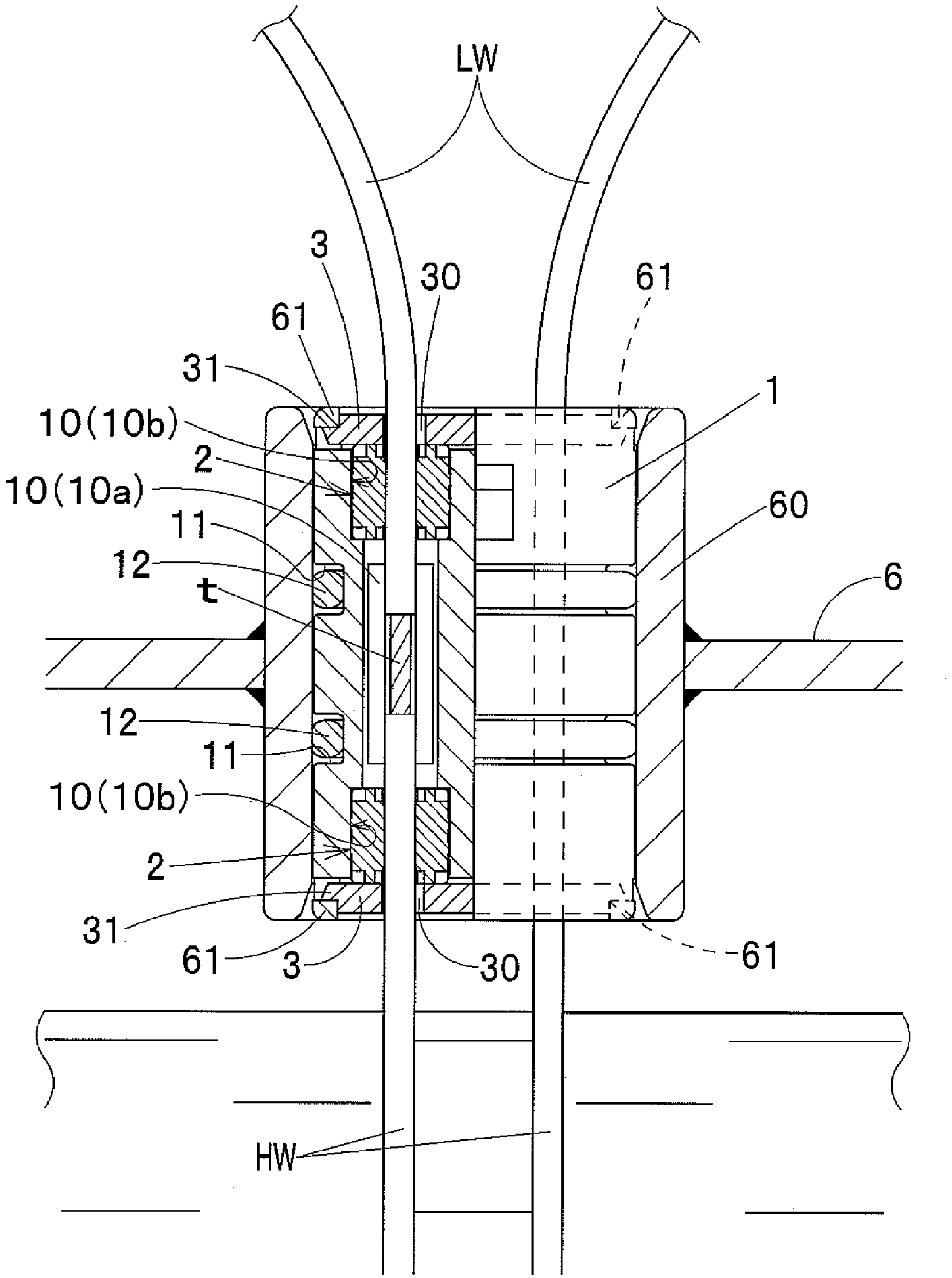
FIG. 2 is an enlarged view showing the connection structure for the lead wire and the heater wire.
Figure 3:
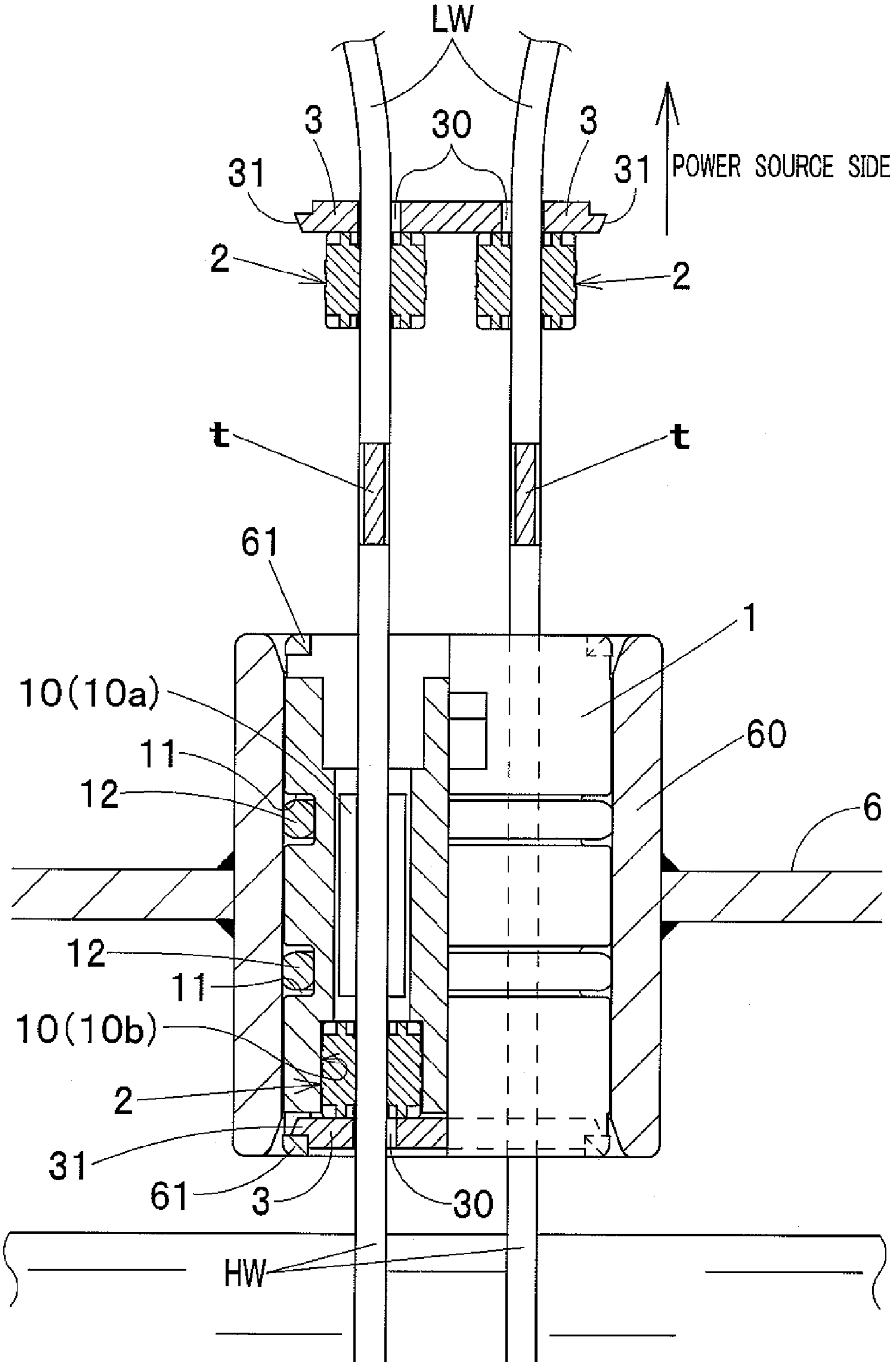
FIG. 3 is a view showing a method for applying the connecting structure.

FIG. 1 is a cross-sectional view showing a connection structure for a lead wire LW and a heater wire HW, which is applied to a tank 6, in a first embodiment according to the present invention. FIG. 2 is an enlarged view showing the structure for connecting the lead wire LW and the heater wire HW. FIG. 3 is a view showing a method for applying the connecting structure.

The first embodiment relates to a connection structure applied to a tank 6, as shown in FIG. 1. In this embodiment, liquid flowing into the tank 6 through a pipe P1 is heated up to a predetermined temperature, and the heated liquid flows out from the tank 6 by opening a valve B, wherein the heater wire HW is used as a liquid heating means. The heater wire HW is connected to an electric power supply (not shown in FIGS.) via the lead wire LW.

Here, the above-described structure for connecting the lead wire LW and the heater wire HW to each other is comprised of: a tube member 60 having a cylindrical hollow; a columnar body 1 housed in the tube member 60 in a watertight manner;

a through hole 10 extending in an axial direction of the tube member 60 in the body 1; seal members 2 arranged at both sides of the through hole 10; and stopper members 3 each having a hole 30 formed coaxially with the through hole 10 and allowing the seal members 2 to be removably attached with respect to the body 1, as shown in FIGS. 1 and 2. Furthermore, as shown in FIGS. 2 and 3, the heater wire HW is extended into the body 1 from the liquid side of the tank 6 in such a manner as to pass through both the hole 30 and the seal member 2 at one side (the lower side in FIGS. 2 and 3), and the lead wire LW is extended out of the body 1 toward an electric power supply to be connected with in such a manner as to pass through both the hole 30 and the seal member 2 at the other side (the upper side in FIGS. 2 and 3). The connecting section t of the heater wire HW and the lead wire LW is aligned to be located in a space of the through hole 10 between the upper and lower seal members 2.

As shown in FIGS. 1 and 2, the tube member 60 is placed at a center of an upper wall of the tank 6 and both the inner and outer periphery of the tube member 60 is formed in a circular shape in cross section, and further, provided with locks 61 around its open sides.

The body 1 is formed into a columnar shape with a diameter slightly smaller than an inner diameter of the tube member 60, as shown in FIGS. 1 and 2. Two O-ring grooves 11 are formed at an outer peripheral surface of the tube member 60. An O-ring 12 is fitted into each of the O-ring grooves 11, so that the body 1 is housed in the tube member 60 in a watertight manner.

The through hole 10, as shown in FIG. 2, has a small-diameter portion 10*a* at a center thereof, and large-diameter portions 10*b* each having a diameter larger than the small-diameter portion 10*a* on both end sides of the small-diameter portion 10*a*. Incidentally, the small-diameter portion 10*a* has a diameter about twice to triple the diameter of the lead wire LW or the heater wire HW, as shown in FIG. 2.

As shown in FIGS. 2 and 3, each of the seal members 2 is formed into a ring-like-shape to be fitted into the large-diameter portion 10*b* in a watertight manner with respect to the outer periphery thereof, so that the lead wire LW or the heater wire HW can pass through the center space of the through hole 10 in a watertight manner with respect to the outer periphery thereof.

Each of the stopper members 3 is formed into a disk-like-shape having lock pawls 31 at an outer periphery thereof, as shown in FIGS. 2 and 3. When the stopper member 3 is fitted into the body 1, the lock pawls 31 are engaged with the lock 61 so as to lock the stopper member 3.

As shown in FIG. 2, each of the holes 30 is made to have a diameter slightly larger than the lead wire LW and the heater wire HW.

The shape or the number of the through hole 10, the stopper member 3 and the seal member 2 are not limited them as described above, they may be modified in order to connect a plurality of lead wires LW and a plurality of heater wires HW to each other.

(Steps of connecting the Lead Wire LW and Heater Wire HW)

(1) One (i.e., the upper) stopper member 3 and one (i.e., the upper) seal member 2 are detached from the body 1.

(2) The heater wire HW is inserted through the hole 30 of the other (i.e., the lower) stopper member 3 and the other (i.e., the lower) seal member 2, so that a tip of the heater wire HW is extended out of an upper surface of the body 1.

(3) The lead wire LW is inserted through one (i.e., the upper) stopper member 3 and one (i.e., the upper) seal member 2, and then, the lower end of the lead wire LW and the upper end of the heater wire HW are connected to each other (so as to form the connecting section t).

(4) When the connecting section t is placed at the small-diameter portion 10*a* of the through hole 10, the stopper member 3 is simultaneously pressed against the body 1, so that the lock pawl 31 is engaged with the lock 61 so as to lock the stopper member 3 with the body 1.

With the above-described remarkably simple works (1) to (4), the lead wire LW and the heater wire HW can be connected to each other with keeping out water from the lead wire LW.

This connection structure for the lead wire LW and the heater wire HW has the following advantages.

(1) Small Space:

When a plurality of through holes 10 are provided in the body 1 (like holes of a lotus root) of this embodiment, a plurality of wires can be connected with each other in only one body 1, and the connection structure for the lead wire LW and the heater wire HW per wire can be formed without requiring a large space.

(2) Excellent Workability:

As described in the above section of (Steps of connecting the Lead Wire LW and Heater Wire HW), the lead wire LW and the heater wire HW can be connected to each other with keeping out water from the lead wire LW with the remarkably simple works.

(3) No twisting of Lead Wire LW and Heater Wire HW:

It is clear that there occurs no twisting in the lead wire LW and the heater wire HW from the description of the above section of (Steps of connecting the Lead Wire LW and Heater Wire HW). Thus, any wires, regardless of whether the wires are strong or weak, can be used for this connection structure.

Second Embodiment

Figure 4:
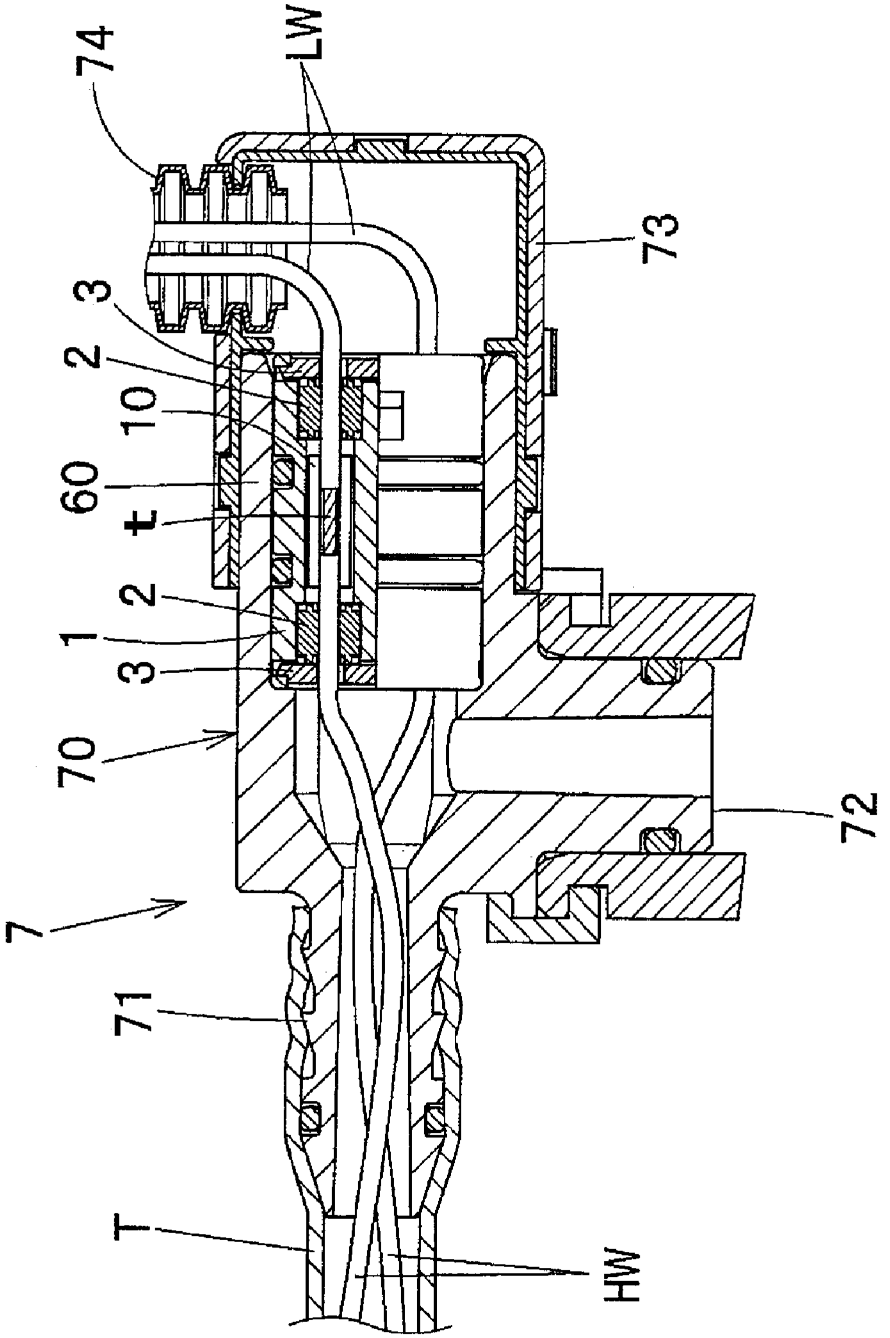
FIG. 4 is a cross-sectional view showing a pipe joint, to which a connection structure for a lead wire and a heater wire is applied, in a second embodiment according to the present invention.

FIG. 4 is a cross-sectional view showing a pipe joint 7, to which a connection structure for a lead wire LW and a heater wire HW of the present invention is applied.

The pipe joint 7, as shown in FIG. 4, includes: a main body 70; a joint portion 71 with a jagged shape extending in an axial direction of the body 1; a water drain port 72 formed in a direction perpendicular to the axis of the body 1; a rear cover 73 adapted to cover a portion opposite to the joint portion 71; and a cable protecting tube 74 attached to the rear cover 73. The body 1, seal members 2 and stopper members 3, like those in the first embodiment are inserted into a cylindrical hollow defined by an inner wall 60 of the pipe joint 7, thereby constituting the connection structure for the lead wire LW and the heater wire HW. Here, a tube T is engaged with the joint portion 71 in a stopped manner, and the heater wire HW can be provided within the tube T, as shown in FIG. 4. Specifically, in the pipe joint 7 according to the present embodiment, liquid can flow through the tube T while being heated by the heater wire HW.

The connection structure for the lead wire LW and the heater wire HW can be incorporated into the pipe joint 7 with the same manner as described in the first embodiment.

Further, the number of each of through holes 10, stopper members 3 and seal members 2 may be modified in order to connect a plurality of lead wires LW and a plurality of heater wires HW to each other.

Third Embodiment

Figure 5:
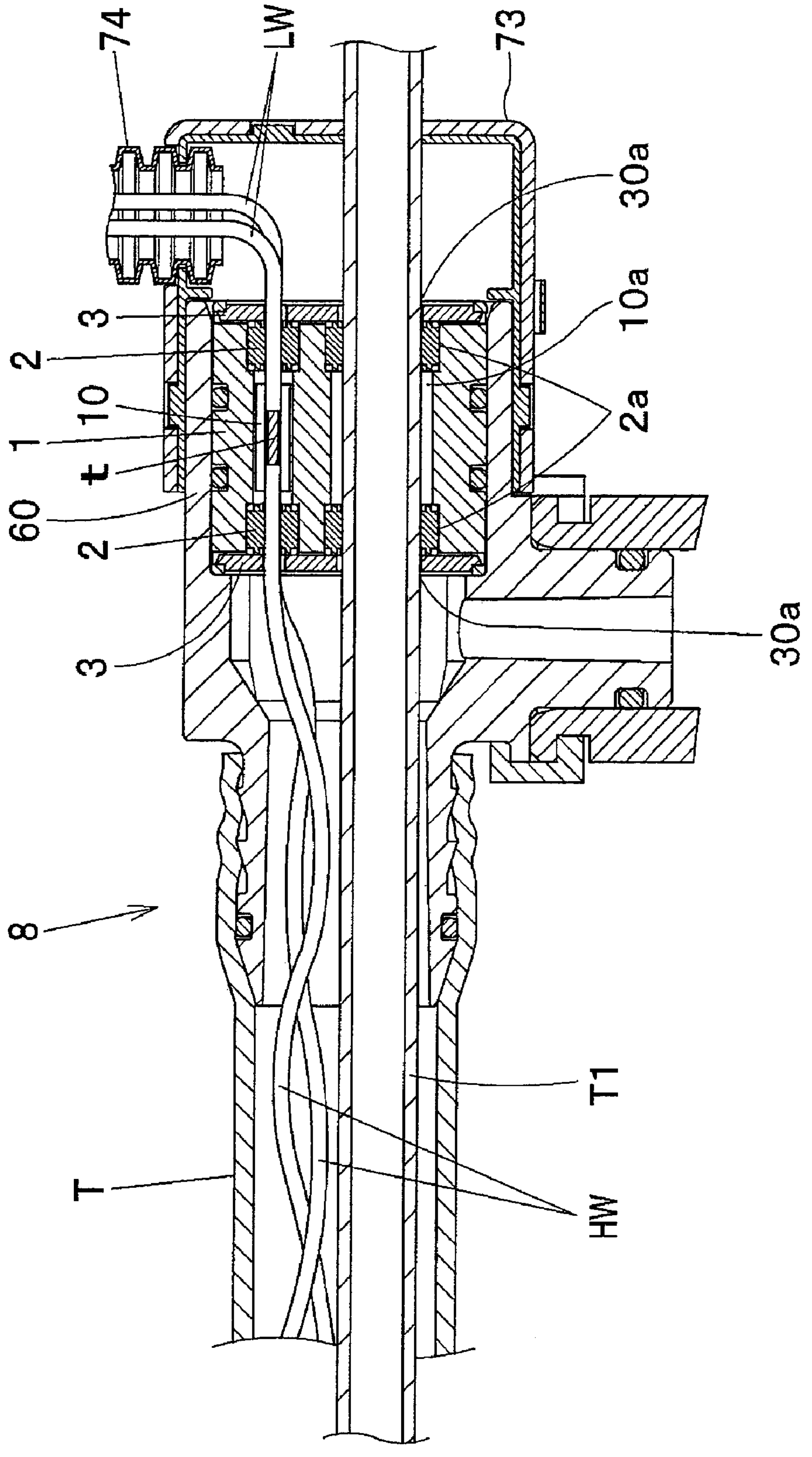
FIG. 5 is a cross-sectional view showing a pipe joint, to which a connection structure for a lead wire and a heater wire is applied, in a third embodiment according to the present invention.
Figure 6:
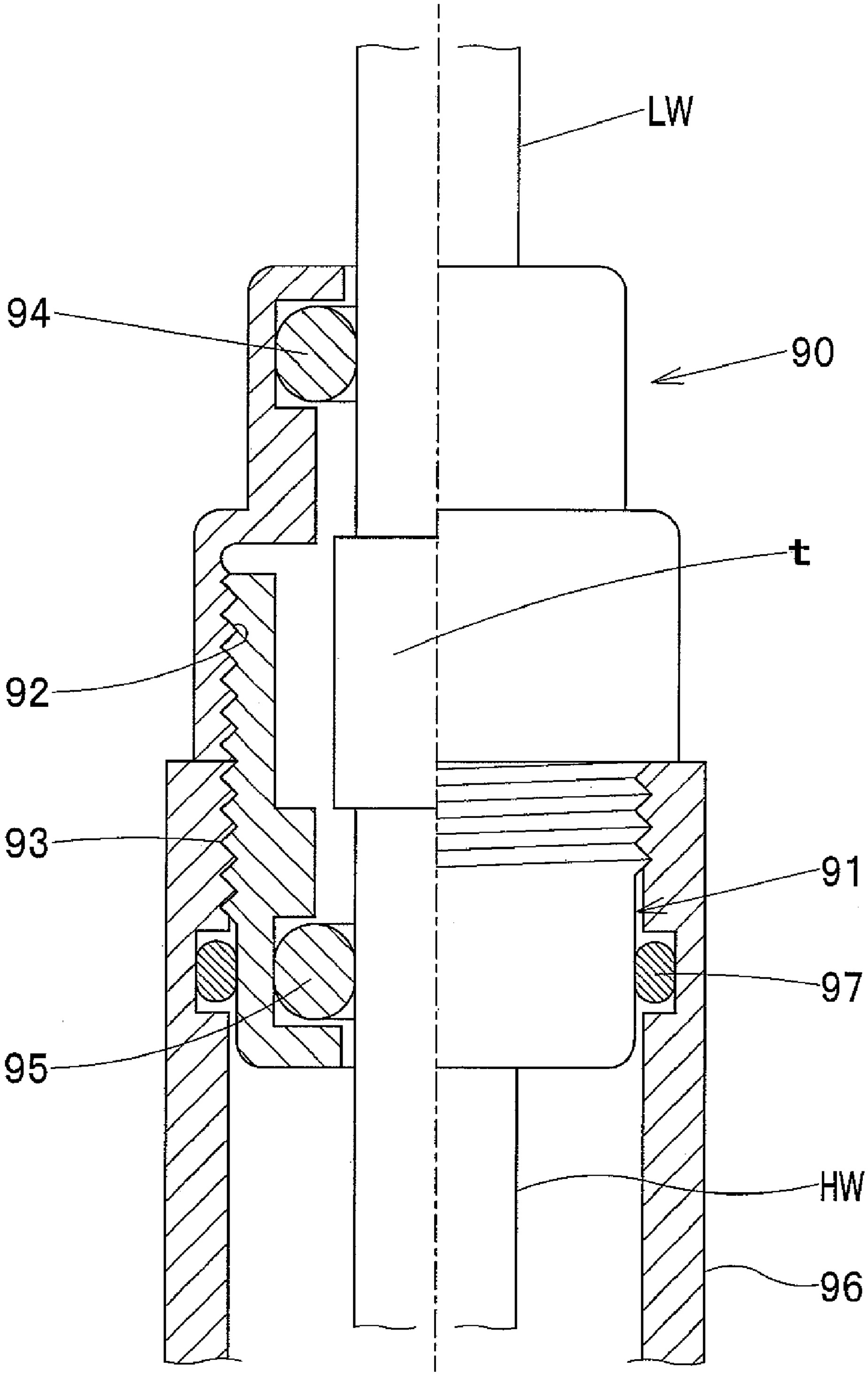
Fig. 6 Related Art
FIG. 6 is a cross-sectional view showing a connection structure for a lead wire and a heater wire according to a related art.

FIG. 5 is a cross-sectional view showing a pipe joint 8, to which a connection structure for a lead wire LW and a heater wire HW of the present invention is applied.

The pipe joint 8, as shown in FIG. 5, is basically configured in the same manner as described in the second embodiment. However, an inner tube T1 provided in the tube T in the pipe joint 8 in order to make another flow passage other than the tube T passes through the body 1 and the stopper members 3, 3. The body 1 of the pipe joint 8 is therefore further provided with the second through hole 10*a* extending in the axial direction of the pipe joint 8. The second through hoe 10*a* is provided with the second seal members 2*a* and the second holes 30*a* of the stopper member 3 respectively at both side of the second through hole 10*a* so that the inner tube T1 can pass through the second through hole 10*a* and the second holes 30*a* in a watertight manner by the second seal member 2*a*. The inner tube Ti passes through not only the body 1 but also the stopper members 3 and a rear cover 73. The liquid flowing in the inner tube T1 is heated indirectly by the heater wires HW in the tube T.

The inner tube T1 passes through the body 1 in a watertight manner with respect to the outer periphery thereof by the second seal members 2*a,* as shown in FIG. 5, like the lead wire LW and the heater wire HW passes through the body 1 in a watertight manner by the seal member 2.

Further, the number of inner tubes T1 is not limited to one, and more than one inner tubes may be arranged in the tube T. It is also possible to arrange one or more inner tubes on the inner tube T1.

Those skilled in the art will appreciate that various adaptation and modifications of the just-described preferred embodiment can be configured without departing from the scope and sprit of the invention. Therefore, it is to be understood that, within the scope of the appended claims, the invention may be practiced other than as specifically described herein.

What is claimed is:

1. A connection structure for a lead wire and a heater wire comprising:

a tube member;

a body housed in the tube member in a watertight manner;

a through hole extending in an axial direction of the tube member in the body;

seal members respectively arranged at both sides of the through hole; and stopper members each having a hole formed coaxially with the through hole and allowing the seal members to be removably attached with respect to the body; wherein the heater wire is extended into the body from a liquid side in such a manner as to pass through both the hole and the seal member at one side, the lead wire is extended out of the body toward an electric power supply to be connected with in such a manner as to pass through both the hole and the seal member at the other side, and a connecting section of the heater wire and the lead wire is located in a space of the through hole between the seal members.

2. The connection structure for a lead wire and a heater wire according to claim 1, wherein the body is provided with a plurality of through holes with a corresponding number of the seal members and the holes of the stopper members.

3. The connection structure for a lead wire and a heater wire according to claim 2, wherein the body is provided with a second through hole, second seal members and second holes of the stopper member respectively at both side of the second through hole, so that an inner tube passes through the second through hole and the second holes in a watertight manner by the second seal members.

4. The connection structure for a lead wire and a heater wire according to claim 1, wherein the body is provided with a second through hole, second seal members and second holes of the stopper member respectively at both side of the second through hole, so that an inner tube passes through the second through hole and the second holes in a watertight manner by the second seal members.

* * * * *